(12) United States Patent
Takahashi et al.

(10) Patent No.: US 9,394,940 B2
(45) Date of Patent: Jul. 19, 2016

(54) MOTION GUIDE DEVICE

(71) Applicant: THK CO., LTD., Tokyo (JP)

(72) Inventors: Toru Takahashi, Tokyo (JP); Ryuji Furusawa, Tokyo (JP); Tetsuro Kurokawa, Tokyo (JP); Keisuke Nagaike, Tokyo (JP)

(73) Assignee: THK CO., LTD., Tokyo (JP)

( * ) Notice: Subject to any disclaimer, the term of this patent is extended or adjusted under 35 U.S.C. 154(b) by 38 days.

(21) Appl. No.: 14/764,636

(22) PCT Filed: Jan. 24, 2014

(86) PCT No.: PCT/JP2014/000356
§ 371 (c)(1),
(2) Date: Jul. 30, 2015

(87) PCT Pub. No.: WO2014/119266
PCT Pub. Date: Aug. 7, 2014

(65) Prior Publication Data
US 2015/0369282 A1 Dec. 24, 2015

(30) Foreign Application Priority Data

Jan. 31, 2013 (JP) .................................. 2013-016506
Jan. 22, 2014 (JP) .................................. 2014-009427

(51) Int. Cl.
*F16C 29/06* (2006.01)
(52) U.S. Cl.
CPC ........... *F16C 29/0611* (2013.01); *F16C 29/065* (2013.01)
(58) Field of Classification Search
CPC ............... F16C 29/066; F16C 29/0609; F16C 29/0611; F16C 29/0635
See application file for complete search history.

(56) References Cited

U.S. PATENT DOCUMENTS

| 4,486,054 A | 12/1984 | Oetjen et al. |
| 5,193,914 A | 3/1993 | Tanaka |

(Continued)

FOREIGN PATENT DOCUMENTS

| JP | 59-43218 A | 3/1984 |
| JP | 4-194413 A | 7/1992 |

(Continued)

OTHER PUBLICATIONS

International Search Report dated Apr. 8, 2014, issued in counterpart application No. PCT/JP2014/000356 (2 pages).

(Continued)

*Primary Examiner* — Thomas R. Hannon
(74) *Attorney, Agent, or Firm* — Westerman, Hattori, Daniels & Adrian, LLP

(57) ABSTRACT

The linear guide 10 includes a track rail 20, a movable block 30, and rollers 40 arranged between the track rail 20 and the movable block 30 and capable of endlessly circulating. A section of the linear guide 10 including an axis line of the rollers 40 and taken vertically across an unloaded roller rolling path 50 or a direction change path 60, the unloaded roller rolling path 50 or the direction change path 60 includes attitude support portions 55 that support an attitude of the rollers 40 rolling on the unloaded roller rolling path 50 or the direction change path 60, and space portions 54, 54a, and 54b that release a lubricant present inside the unloaded roller rolling path 50 or the direction change path 60. With such configuration, a smooth guide motion of a motion guide device is achieved unaffected by the lubricant in an unloaded circulation path.

4 Claims, 13 Drawing Sheets

(56) References Cited

U.S. PATENT DOCUMENTS

| | | | |
|---|---|---|---|
| 2005/0185864 A1* | 8/2005 | Menges | F16C 29/0607 384/44 |
| 2009/0232427 A1* | 9/2009 | Wu | F16C 29/0611 384/44 |
| 2013/0071052 A1* | 3/2013 | Chen | F16C 33/363 384/44 |

FOREIGN PATENT DOCUMENTS

| | | | |
|---|---|---|---|
| JP | 6-10622 U | 2/1994 | |
| JP | 2005-201333 A | 7/2005 | |
| JP | 3142162 U | 6/2008 | |
| JP | 2008-151226 A | 7/2008 | |

OTHER PUBLICATIONS

Notification of Reason(s) for Refusal dated Jul. 29, 2014, issued in counterpart application No. JP2014-009427 (7pages).

Decision to grant a patent dated Jan. 6, 2015, issued in counterpart application No. JP2014-009427 (7pages).

* cited by examiner

US 9,394,940 B2

MOTION GUIDE DEVICE

TECHNICAL FIELD

The present invention relates to a motion guide device.

BACKGROUND ART

A motion guide device of this type is provided with a track member attached to a fixed portion, and a moving member fixed to a movable portion. The moving member is assembled to the track member in a rectilinearly movable manner. Between the track member and the moving member, many rollers for reducing frictional resistance are interposed being capable of making a rolling motion. A circuit-like endless circulating path on which the rollers circulate is provided to the moving member. The circuit-like endless circulating path of the motion guide device is constituted of an unloaded rolling element rolling path that is parallel to a loaded rolling element rolling path between a rolling element rolling surface of the track member and a loaded rolling element rolling surface of the moving member, and a pair of U-shaped direction change paths that connects the loaded rolling element rolling path with the unloaded rolling element rolling path (see Patent Literature 1 below).

In the endless circulating path, many rollers are arranged and housed. Many rollers are rotatably held by a roller retainer. The roller retainer is provided with many spacers interposed between the rollers in the front and back in a travelling direction, and a belt portion coupling the spacers together. The spacer is interposed between the rollers in the front and back in the travelling direction to prevent the rollers in the front and back in the travelling direction from coming in sliding contact with each other. In addition, it is possible to make assembly of the roller retainer easy by coupling many spacers together using the belt portion. Furthermore, by using this roller retainer, it is configured to prevent skew of the rollers. In addition, a roller retainer belt guide groove that guides the belt portion is provided to the unloaded rolling element rolling path and the direction change path, whereby the belt portion guides the rollers on an unloaded circulation path.

CITATION LIST

Patent Literature

Patent Literature 1: JP 2005-201333 A

SUMMARY OF THE INVENTION

Problems to be Solved by the Invention

However, a shape inside of a conventional unloaded circulation path is a roller shape or a shape having a gap substantially uniformly around an outer periphery of a sectional shape including a belt portion. To the gap, a lubricant such as grease and oil is filled or applied/adhered. When a roller is rolled in this state, this lubricant acts as resistance and a load is applied also to a roller retainer, whereby sliding resistance of a motion guide device itself may be increased. In addition, since the lubricant is a viscous body, depending on a use environment, the resistance may be changed depending on a temperature and a speed/acceleration during passing.

The present invention has been made in view of a problem present in the above-described related art, and an objective thereof is to achieve a motion guide device capable of performing smooth guide motion in which a plurality of rolling elements rolling on the unloaded circulation path is not affected by the lubricant.

Means for Solving the Problems

A motion guide device according to the present invention includes a track member having a rolling element rolling surface extending in a longitudinal direction, a moving member having a loaded rolling element rolling surface facing the rolling element rolling surface, an unloaded rolling element rolling path extending in parallel with the loaded rolling element rolling surface, and a pair of direction change paths connecting the loaded rolling element rolling surface with the unloaded rolling element rolling path, a plurality of rolling elements arranged on an endless circulating path including a loaded rolling element rolling path between the rolling element rolling surface of the track member and the loaded rolling element rolling surface of the moving member, the unloaded rolling element rolling path, and the direction change path. In a section including an axis line of the rolling element and taken vertically across the unloaded rolling element rolling path or the direction change path, the unloaded rolling element rolling path or the direction change path includes an attitude support portion that supports an attitude of the rolling element rolling on the unloaded rolling element rolling path or the direction change path, and a space portion allowing a lubricant present inside of the unloaded rolling element rolling path or the direction change path to be released.

Effects of the Invention

According to the present invention, it is possible to achieve the motion guide device capable of performing the smooth guide motion having the plurality of rolling elements, which rolls on the unloaded circulation path, not affected by the lubricant.

MODE FOR CARRYING OUT THE INVENTION

Hereinafter, a preferred embodiment for carrying out the present invention is described by using the drawings. Note that the embodiment below is not intended to limit the invention according to each of claims. In addition, not all of combinations of features described in the embodiment are necessary for a solution to the problem.

Figure 1:
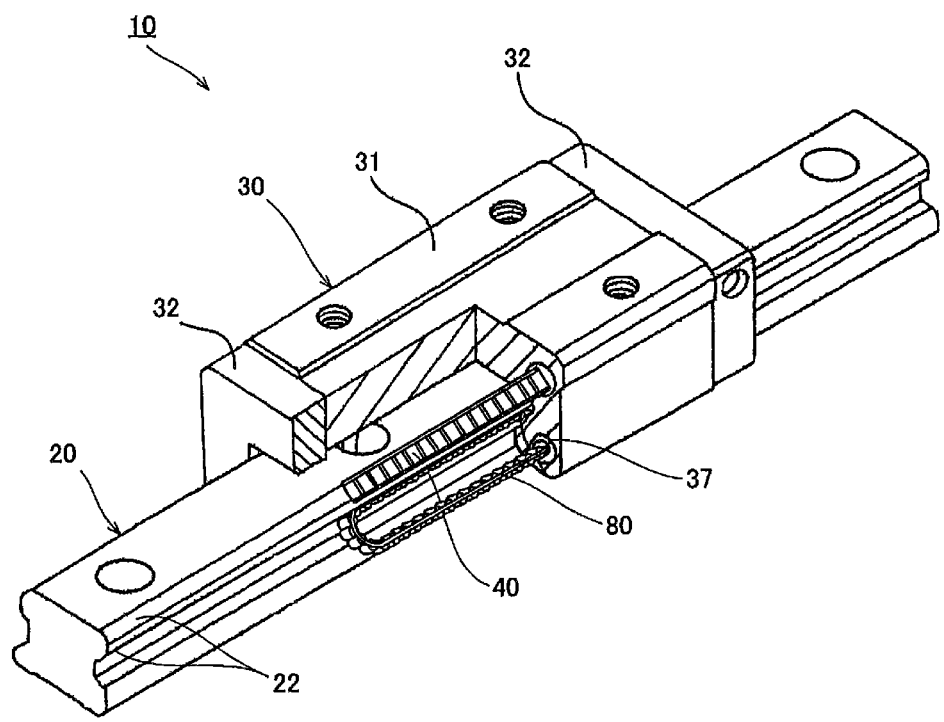
FIG. 1 is a partial sectional view of a linear guide according to this embodiment.
Figure 2:
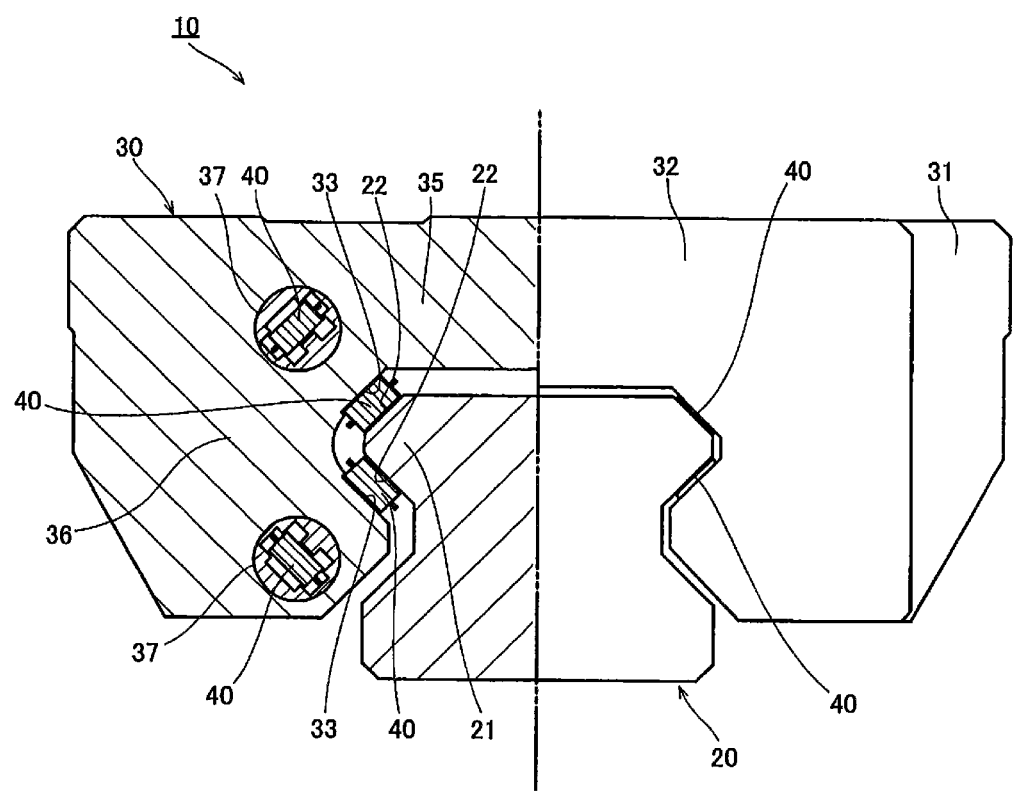
FIG. 2 is a front view of a partial section of the linear guide according to this embodiment.
Figure 3:
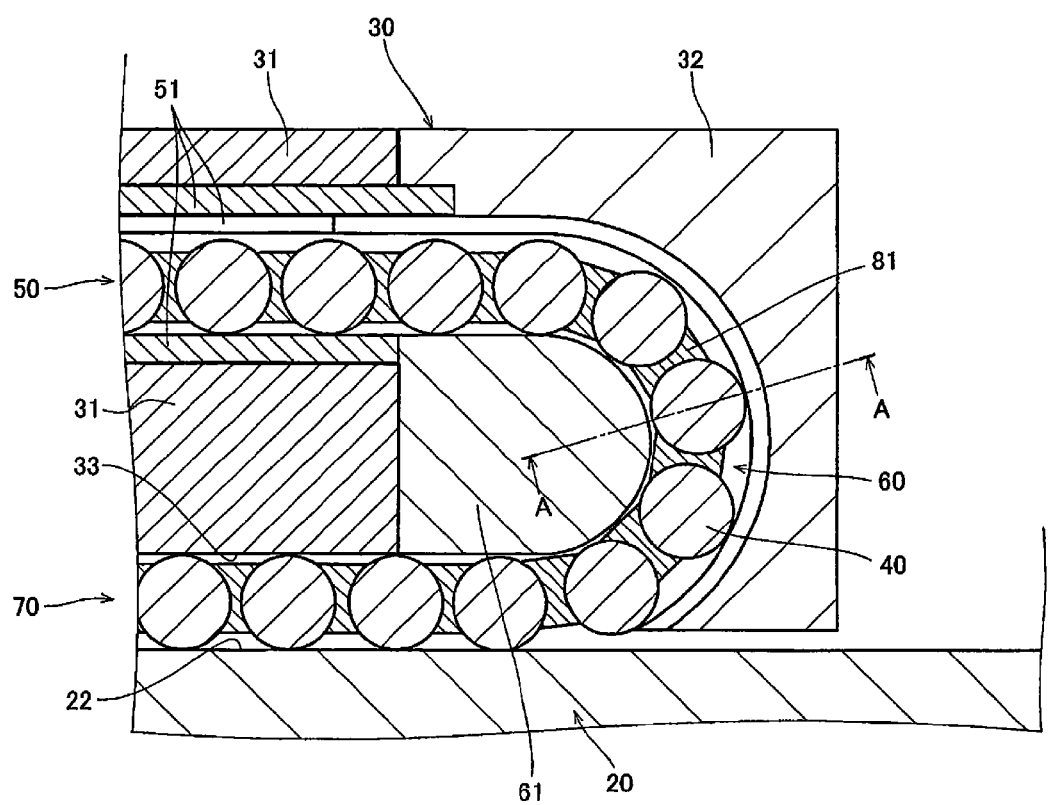
FIG. 3 is a sectional view illustrating a direction change path according to this embodiment.
Figure 4:
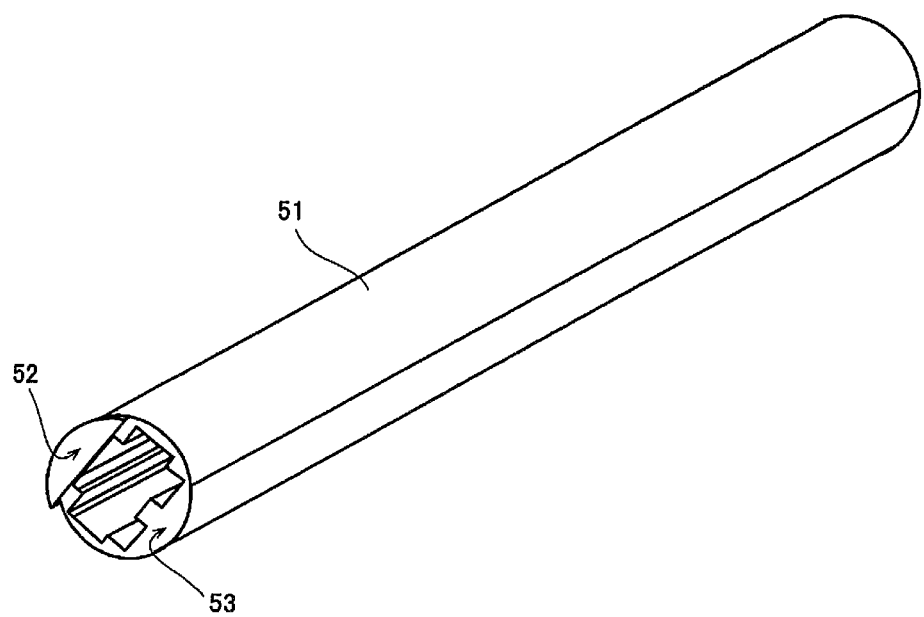
FIG. 4 is an enlarged sectional view illustrating a configuration of a pipe member according to this embodiment.
Figure 5:
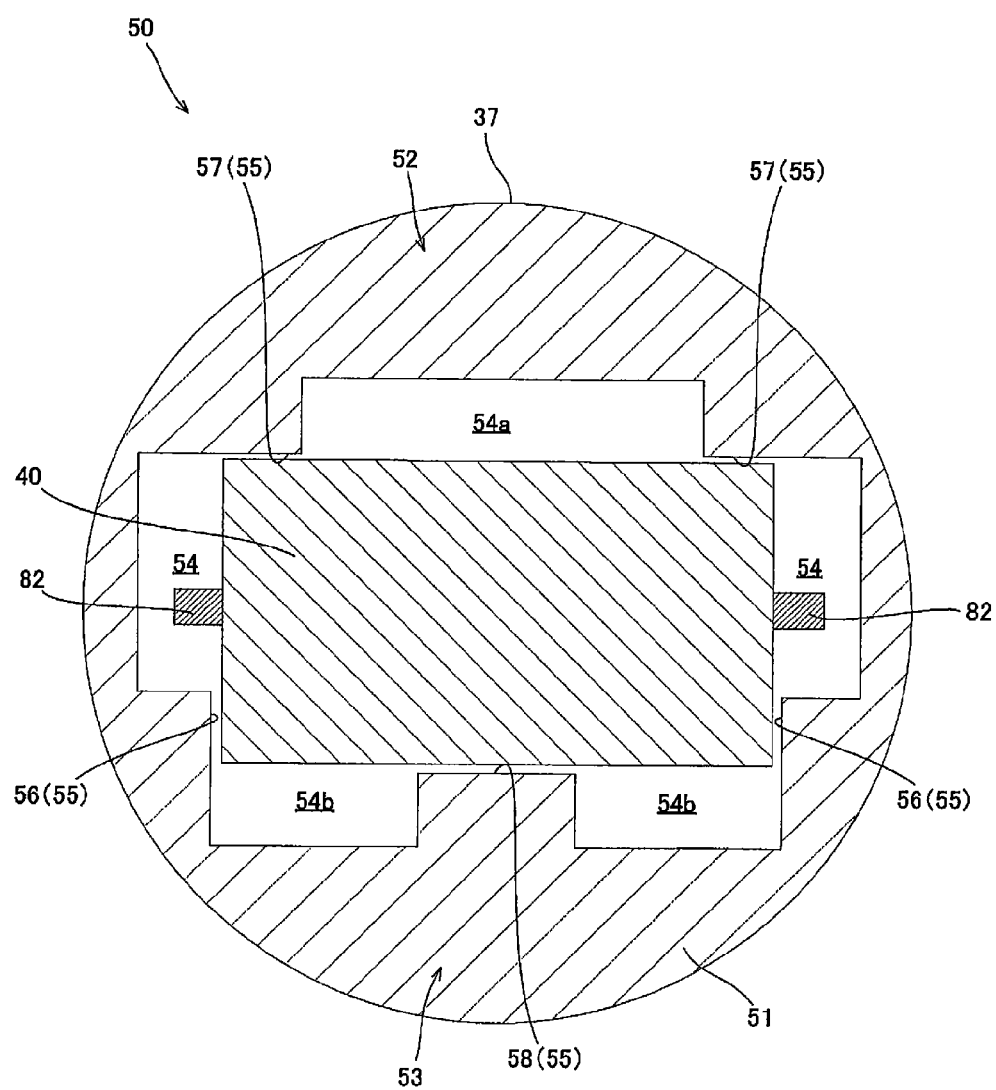
FIG. 5 is a view illustrating a section A-A of FIG. 3.

FIG. 1 is a partial sectional view of a linear guide 10 according to this embodiment. FIG. 2 is a front view of a partial section of the linear guide 10 according to this embodiment. FIG. 3 is a sectional view illustrating a direction change path 60 according to this embodiment. FIG. 4 is a view illustrating a configuration of a pipe member 51 according to this embodiment. FIG. 5 is a view illustrating a section A-A of FIG. 3.

As illustrated in FIGS. 1 and 2, the linear guide 10 includes a track rail 20 as a linearly extended track member and a movable block 30 as a moving member that is assembled to the track rail 20 in a rectilinearly movable manner through rollers 40 as many rolling elements.

The track rail 20 is a member formed to have a substantially rectangular section and a thin elongated shape. A substantially V-shaped recess is formed on each of right and left side surfaces of the track rail 20. On an upper part of the recess, a pair of right and left projections 21 projecting in a width direction is formed. On upper and lower surfaces sandwiching each of the projections 21, a roller rolling surface 22 as a rolling element rolling surface extending in a longitudinal direction of the track rail 20 is formed. In this embodiment, two roller rolling surfaces 22 are formed on each of the projections 21, whereby four roller rolling surfaces 22 in total are formed.

The movable block 30 is provided with a movable block main body 31 and an end plate 32 that is attached to both end sides in a moving direction of the movable block main body 31.

In the movable block main body 31, a loaded roller rolling surface 33 as a loaded rolling element rolling surface facing the roller rolling surface 22 of the track rail 20, and an unloaded roller rolling path 50 as an unloaded rolling element rolling path arranged in parallel with the loaded roller rolling surface 33 are formed.

The end plate 32 is a pair of lid members provided to the movable block main body 31. The direction change path 60, which is connected with the loaded roller rolling surface 33 and the unloaded roller rolling path 50, is formed in the end plate 32. To the end plate 32, a seal or the like (not illustrated) for preventing a foreign matter such as dust from getting mixed inside of the movable block 30 is also arranged.

In a state where the track rail 20 is arranged on a horizontal plane, the movable block 30 is provided with a central portion 35 facing an upper surface of the track rail 20 and a pair of side wall portions 36 extending downward from both of right and left sides of the central portion 35 and facing right and left sides of the track rail 20. The movable block 30 is formed in a saddle shape as a whole.

Between the roller rolling surface 22 of the track rail 20 and the loaded roller rolling surface 33 of the movable block 30, a loaded roller rolling path 70 as a linearly extended loaded rolling element rolling path is formed. The loaded roller rolling path 70 extends linearly in a direction parallel with the unloaded roller rolling path 50. An end portion of the loaded roller rolling path 70 and an end portion of the unloaded roller rolling path 50 are connected with a pair of direction change paths 60 formed in a U shape. A circuit-like endless circulating path is constituted of the unloaded roller rolling path 50, the direction change path 60, and the loaded roller rolling path 70.

As illustrated in FIG. 3, when the movable block 30 is moved relatively against the track rail 20, a plurality of rollers 40 makes a rolling motion while receiving a load on the loaded roller rolling path 70. The rollers 40, which have rolled over to an end of the loaded roller rolling path 70, enter the unloaded roller rolling path 50 after going through the U-shaped direction change path 60. The rollers 40, which have gone through the unloaded roller rolling path 50, after going through the direction change path 60 on an opposite side, enter the loaded roller rolling path 70 again.

In the movable block main body 31, a through hole 37 is formed in a direction parallel with the loaded roller rolling path 70. A resin molded hollow pipe member 51 is inserted in the through hole 37. As illustrated in FIG. 4, the pipe member 51 is configured to include an outer periphery side guide portion 52 connecting with an outer periphery side of the unloaded roller rolling path 50 and an inner periphery side guide portion 53 connecting with an inner periphery side of a roller circulation path, and a plurality of grooves is formed on an inner wall surface of the pipe member 51.

As illustrated in FIG. 5, an inner wall surface constituted of the outer periphery side guide portion 52 and the inner periphery side guide portion 53 of the pipe member 51 is formed such that a diameter and a length in an axial direction of the roller 40 are housed. On the inner wall surface, a side space portion 54 is formed, and for example, it can be applied to a roller retainer belt guide groove that guides a belt portion 82 of a roller retainer 80. In the roller retainer belt guide groove, for example, a larger space is formed on the outer periphery side than on the inner periphery side interposing a roller axis. It is not to be limited to this, however, and a larger space may be formed on the inner periphery side than on the outer periphery side. Furthermore, attitude support portions 55 that support an attitude of the roller 40 are formed in the pipe member 51 as an unloaded roller rolling path constituent member.

The attitude support portions 55 are classified, according to a position of formation, into two side surface side support portions 56 and 56, two first peripheral surface side support portions 57 and 57 formed on an outer periphery side of the unloaded roller rolling path 50, and one second peripheral surface side support portion 58 formed on an inner periphery side of the unloaded roller rolling path 50. These five attitude support portions 55 are formed in a projected manner from an inner wall surface of the pipe member 51 toward the rollers 40 rolling on the unloaded roller rolling path 50. Note that in this embodiment, the first peripheral surface side support portions 57 are formed in two places; however, it is not to be limited to this configuration, and it is also possible to configure such that the second peripheral surface side support portions 58 are formed in two places. The side surface side support portions 56 and 56 are formed on the inner periphery side; however, it is not to be limited to this configuration, and they may also be formed on the outer periphery side.

The side surface side support portions 56 are projected portions that are formed along a rolling direction of the rollers 40 on the inner wall surface of the pipe member 51 and are formed in pairs. In a section including an axis line of the roller 40 and taken vertically across the unloaded roller rolling path 50, each of the side surface side support portions 56 is formed toward sides facing each other in the axial direction of the roller 40. In a place in a direction where the roller axis positions from a roller facing surface of the side surface side support portion 56, the roller retainer belt guide groove, which is formed in a recessed shape, is formed. It is formed such that a distance between the side surface side support portions 56 and 56 is longer than a length in a width direction of the roller 40.

The first peripheral surface side support portions 57 are projected portions that are formed along the rolling direction of the rollers 40 on the outer periphery side of the unloaded roller rolling path 50 and are formed in pairs. Each of the peripheral surface side support portions 57 and 57 is formed so as to support a slight range on an end face side of the roller 40. Between each of the peripheral surface side support portions 57 and 57, an outer periphery side space portion 54a, which is recessed to the outer periphery side of a roller facing surface of the peripheral surface side support portions 57 and 57, is formed.

The second peripheral surface side support portion 58 is a projected portion that is formed along the rolling direction of the rollers 40 on the inner periphery side of the unloaded roller rolling path 50. The second peripheral surface side support portion 58 is formed so as to support a slight range at a center of the roller 40. Accordingly, a pair of inner periphery side space portions 54b and 54b, which are recessed to the inner periphery side of a roller facing surface of the second peripheral surface side support portion 58, is formed on both sides of the second peripheral surface side support portion 58. A substantially triangular shape is formed when the first peripheral surface side support portions 57 and 57 in two places and the second peripheral surface side support portion 58 are connected with a straight line. Note, however, that it is not necessary to limit a positional relationship between the first peripheral surface side support portions 57 and 57 and the second peripheral surface side support portion 58 to the substantially triangular shape to obtain the same effect.

By the above-described five attitude support portions 55 (56, 56, 57, 57, and 58) formed asymmetrically interposing the axis line of the roller 40, the roller 40, which rolls within a space formed in the inner wall surface of the pipe member 51, even in a case where force to displace in an axis line direction and a peripheral surface direction is applied during rolling, comes in contact with any of the attitude support portions 55 (56, 57, and 58) and is returned to an appropriate attitude and position, whereby the roller 40 can stably roll without being skewed.

According to this embodiment, the linear guide 10 supports the rollers 40, which roll on the unloaded roller rolling path 50, with a pair of side surface side support portions 56 and 56, a pair of first peripheral surface side support portions 57 and 57, and one second peripheral surface side support portion 58. By forming the roller retainer belt guide groove, the outer periphery side space portion 54a, and the pair of inner periphery side space portions 54b and 54b around the roller 40, the lubricant is kept within the sufficiently large space portions 54, 54a, and 54b, whereby it does not receive a bad influence caused by the lubricant in the related art such as a movement of the rollers 40 being hindered by the lubricant. Therefore, according to this embodiment, it is possible to provide the linear guide 10 achieving the smooth guide motion.

Figure 6A:
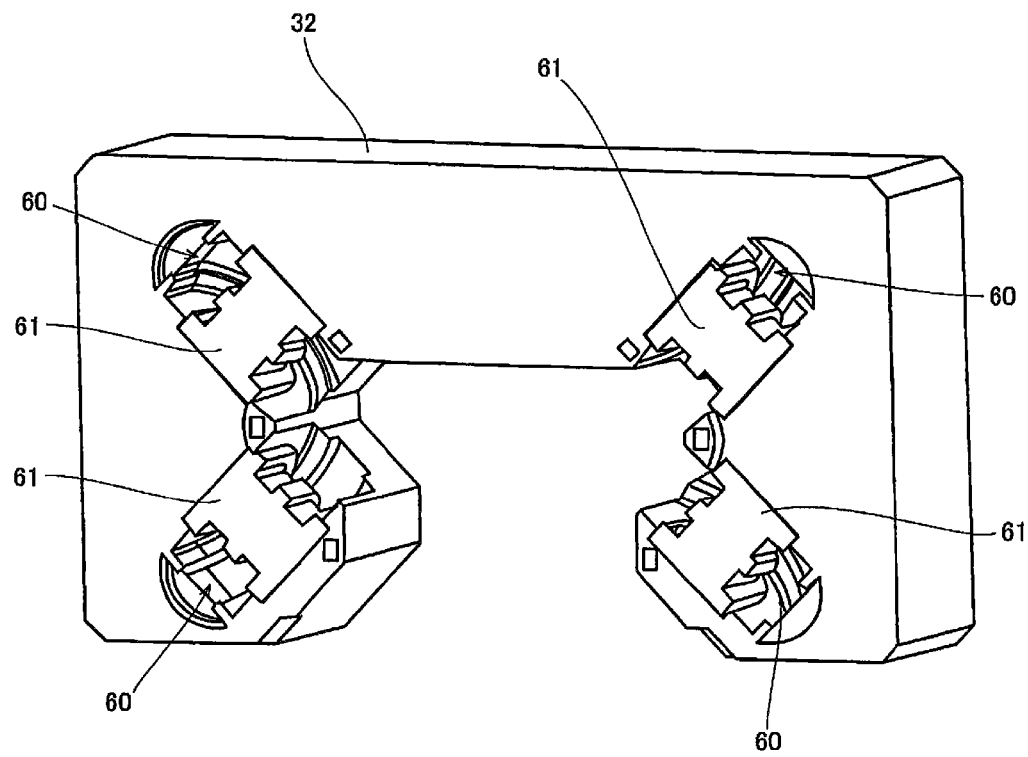
FIG. 6A is a view illustrating a configuration of the direction change path according to this embodiment.
Figure 6B:
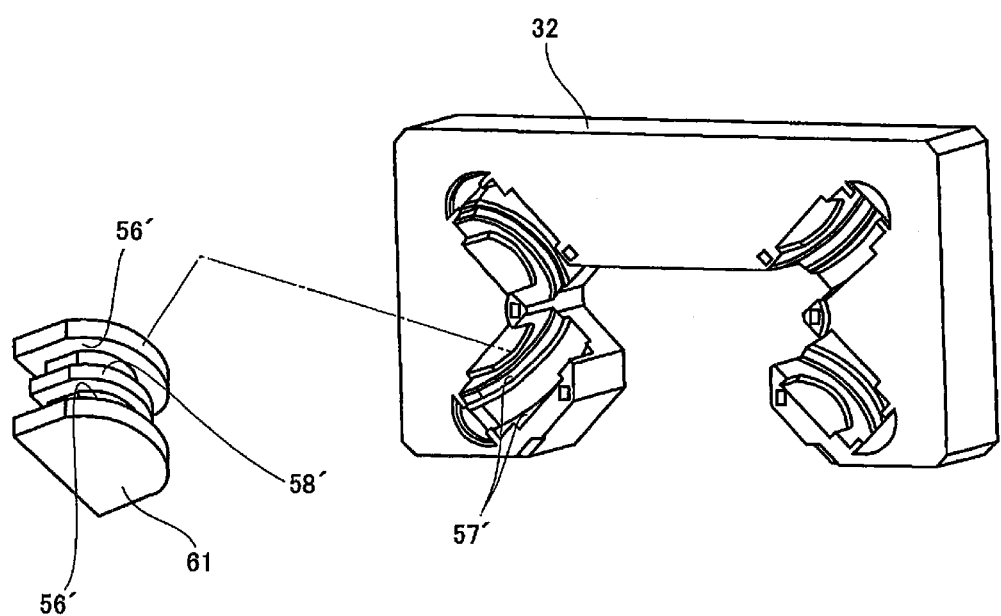
FIG. 6B is a view illustrating a configuration of an R piece, a configuration of an end plate, and a relationship between the R piece and the end plate according to this embodiment.
Figure 6C:
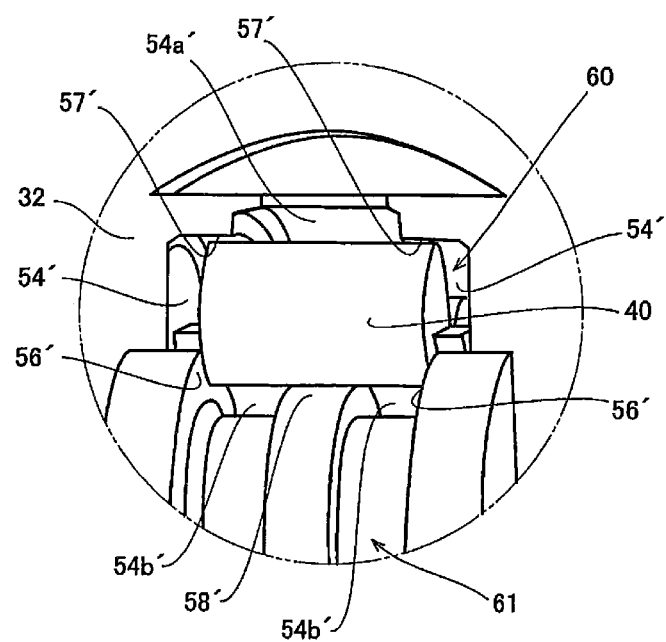
FIG. 6C is an enlarged view of the direction change path according to this embodiment.

Next, a configuration of a direction change path is described by using FIGS. 6A to 6C. FIG. 6A is a view illustrating the configuration of the direction change path 60 according to this embodiment. FIG. 6B is a view illustrating a configuration of an R piece 61, a configuration of the end plate 32, and a relationship between the R piece 61 and the end plate 32 according to this embodiment. FIG. 6C is an enlarged view of the direction change path 60.

As illustrated in FIG. 6A, an inner periphery side of the direction change path 60 is constituted of the R piece 61 as a direction change unit, and an outer periphery side thereof is constituted of the end plate 32 as a lid member. As illustrated in FIG. 6B, the end plate 32 as the outer periphery side of the direction change path 60 is formed in a semicircular shape centering on a predetermined point, and a plurality of grooves is formed along this shape. Due to a step caused by the plurality of grooves, portions 57' and 57' equivalent to the pair of first peripheral surface side support portions 57 and 57 formed in the unloaded roller rolling path 50 are formed on the outer periphery side of the direction change path 60 formed in the end plate 32.

The R piece 61 is a resin fitting member, and as illustrated in FIG. 6B, it is fitted into a fitting groove formed in the end plate 32. The R piece 61 has a semicircular curved portion concentric with an arc on the outer periphery side of the direction change path 60. The plurality of grooves is formed in the curved portion of the R piece 61. Due to the step caused by the plurality of grooves, portions 56' and 56' equivalent to the pair of side surface side support portions 56 and 56 and a portion 58' equivalent to the second peripheral surface side support portion 58 formed in the unloaded roller rolling path 50 along with the semicircular curved portion are formed in the R piece 61.

As illustrated in FIG. 6C, the groove on an inner wall surface of the direction change path 60, which is constituted of the end plate 32 and the R piece 61, has the same configuration as that of the groove formed on the inner wall surface of the pipe member 51. Accordingly, a sectional shape of the direction change path 60, which is constituted of the end plate 32 and the R piece 61, is formed to be the same as a sectional shape of the unloaded roller rolling path 50 illustrated in FIG. 5. That is, the roller 40, when it rolls in an unloaded state (i.e., when it rolls on the unloaded roller rolling path 50 and the direction change path 60), it rolls a path having the same sectional shape.

According to this embodiment, the linear guide 10 supports the rollers 40, which roll on the direction change path 60, with the portions 56' and 56' equivalent to the pair of side surface side support portions 56 and 56, the portions 57' and 57' equivalent to the first peripheral surface side support portions 57 and 57, and the portion 58' equivalent to the second peripheral surface side support portion 58. It is possible to provide the linear guide 10 achieving the smooth guide motion and not affected by the lubricant by forming a space 54' equivalent to the roller retainer belt guide groove, a space 54a' equivalent to the outer periphery side space portion 54a, and spaces 54b' and 54b' equivalent to the pair of inner periphery side space portions 54b and 54b around the roller 40.

Figure 7:
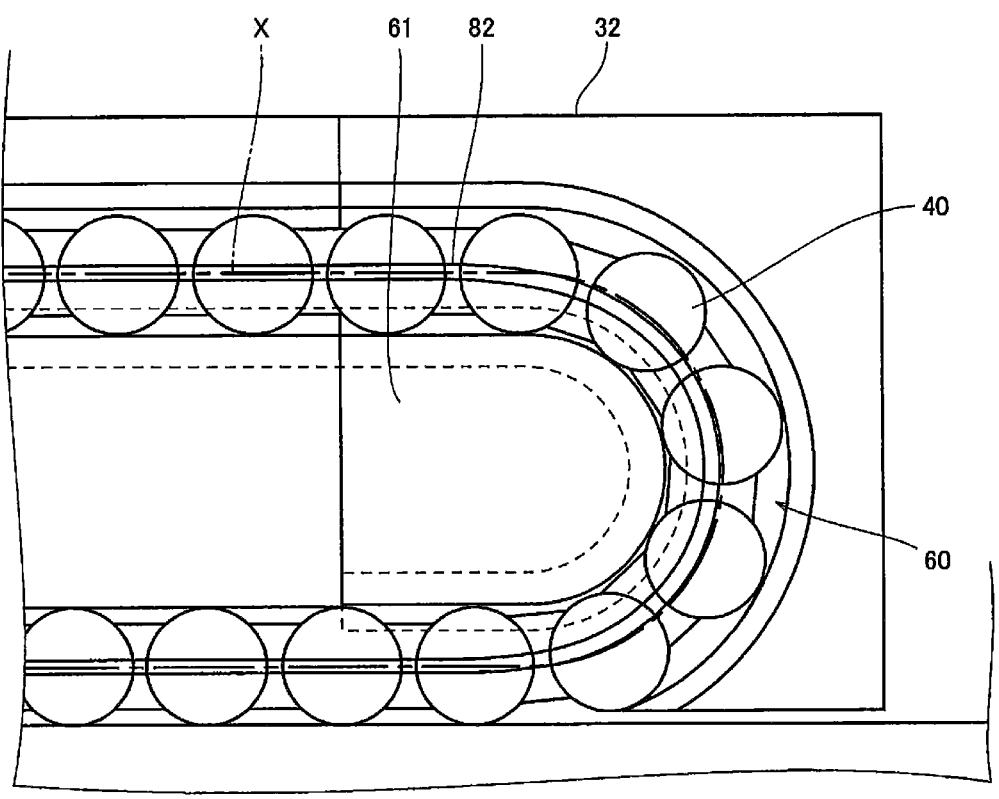
FIG. 7 is a view illustrating how a belt portion is deflected in the direction change path according to this embodiment.

Note that as illustrated in FIGS. 3, 5, and 7, the roller retainer 80 includes a plurality of spacers 81 interposed between the rollers 40 in the front and back in a travelling direction, and the belt portion 82 that couples the plurality of spacers 81. The roller retainer 80 is formed by injection molding and the like of resin. Note that FIG. 7 is a view illustrating how the belt portion is deflected in the direction change path according to this embodiment.

The spacer 81 is formed to have a rectangular section. At both ends in the travelling direction of the spacer 81, a recessed portion having a curved surface corresponding to a peripheral surface of the roller 40 is formed. By the spacer 81, an interval between the rollers 40 is kept constant, whereby it is possible to perform stable rolling without the rollers 40 contacting with each other.

The belt portion 82 is a coupling member that couples the plurality of spacers 81 together. The belt portion 82 is arranged within one plane and projects to both sides of an end face crossing the axis line of the roller 40. The belt portion 82 has flexibility and is linearly extended on the linear loaded roller rolling path 70 and the linear unloaded roller rolling path 50. Then, it is deflected in the U shape on the U-shaped direction change path 60.

As above, an exemplary configuration of the linear guide according to this embodiment has been described.

By the way, as a different method for achieving a smooth rolling movement of the rollers 40, the first inventor on the list has focused on a point that sliding resistance can be reduced by securing a fixed space around the roller 40. Thus, there has been sought after an attitude supporting structure for the roller 40 that supports the attitude of the roller 40 to be fixed while securing the fixed space around the roller 40.

The unloaded roller rolling path 50 according to this embodiment has the attitude support portions 55 in three places on a peripheral surface side of the roller 40 and in two places on the end face side of the roller 40. That is, the attitude support portions 55 are formed in five places in total. The attitude support portions 55 formed on the peripheral surface side of the roller 40 are formed in two places as the first peripheral surface side support portions 57 and 57 supporting the peripheral surface side of the roller 40 in the outer periphery side guide portion 52. In addition, it is formed in one place as the second peripheral surface side support portion 58 supporting the peripheral surface side of the roller 40 in the inner periphery side guide portion 53. The attitude support portions 55 formed on the end face side of the roller 40 are formed in two places at the right and left as the side surface side support portions 56 and 56 in the inner periphery side guide portion 53. Then, between each of the attitude support portions 55 (56, 56, 57, 57, and 58), a space is provided so as not to be overlapped with an external shape of a vertical section of the roller 40. That is to say, in this embodiment, since the projected portions are formed in the number minimally required for determining the attitude of the roller 40, a sectional area of the space formed between the inner wall surface of the pipe member 51 and the roller 40 becomes large in general. Note that in this embodiment, the roller 40 is formed to be longer in the axis line direction, whereby a width on the peripheral surface side is longer. Therefore, to support the roller 40 at many supporting points on a surface with the longer width, the first peripheral surface side support portions 57 and 57 and the second peripheral surface side support portion 58, which are in three places, are formed on the peripheral surface side. In addition, since a stroke of a curved line is longer on an outer surface side constituted of the end plate 32 than on an inner surface side constituted of the R piece 61, the first peripheral surface side support portions 57 and 57, which are formed in two places, are formed on a side of an outer periphery side guide portion 52.

With regard to the sliding resistance of the roller 40, the first inventor on the list has gained knowledge that a force pulling the belt portion 82 of the roller retainer 80 and a force scraping the roller retainer belt guide groove relate to each other. That is to say, when the sliding resistance of the roller 40 is increased, the force pulling the belt portion 82 of the roller 40 is increased in the endless circulating path. In addition, it has been verified that the force pulling the belt portion 82 of the roller retainer 80 and the force scraping the roller retainer belt guide groove appear when starting from a stopped state.

That is to say, as illustrated in FIG. 7, in the direction change path 60, when the belt portion 82 enters inside of a virtual curve x that is drawn by a locus of the axis line of the roller 40 based on the pulling force of the roller 40, the belt portion 82 comes in contact with the roller retainer belt guide groove, whereby the sliding resistance may be increased.

In contrast to this, in the linear guide 10 according to this embodiment, the side space portion 54 formed as the roller retainer belt guide groove is formed as a sufficiently large space, whereby even when the belt portion 82 enters inside of the virtual curve X that is drawn by the locus of the axis line of the roller 40 based on the pulling force of the roller 40, a roller retainer belt according to this embodiment does not come in contact with anywhere of the inner wall surface. Therefore, the linear guide 10 according to this embodiment is capable of reducing the sliding resistance of the roller 40. In addition, according to this embodiment, the roller retainer 80 on the endless circulating path does not receive the bad influence caused by the lubricant, whereby it is possible to realize a smooth circulation movement of the roller 40.

The preferred embodiment of the present invention has been described as above; however, a technical scope of the present invention is not to be limited to a scope described in the above embodiment. It is possible to add various modifications or improvements to the above embodiment.

For example, the attitude support portions 55 according to the above-described embodiment use a configuration to support the roller 40 with a surface; however, a configuration to support it with a point may also be used. The sectional area of the space may be increased compared to when the roller 40 is supported with a surface, whereby it is possible to further reduce the influence of the lubricant and to roll the roller 40 more smoothly.

The track rail 20 and the movable block 30 according to this embodiment are linearly formed; however, these may be formed in a curved manner as well.

Figure 8:
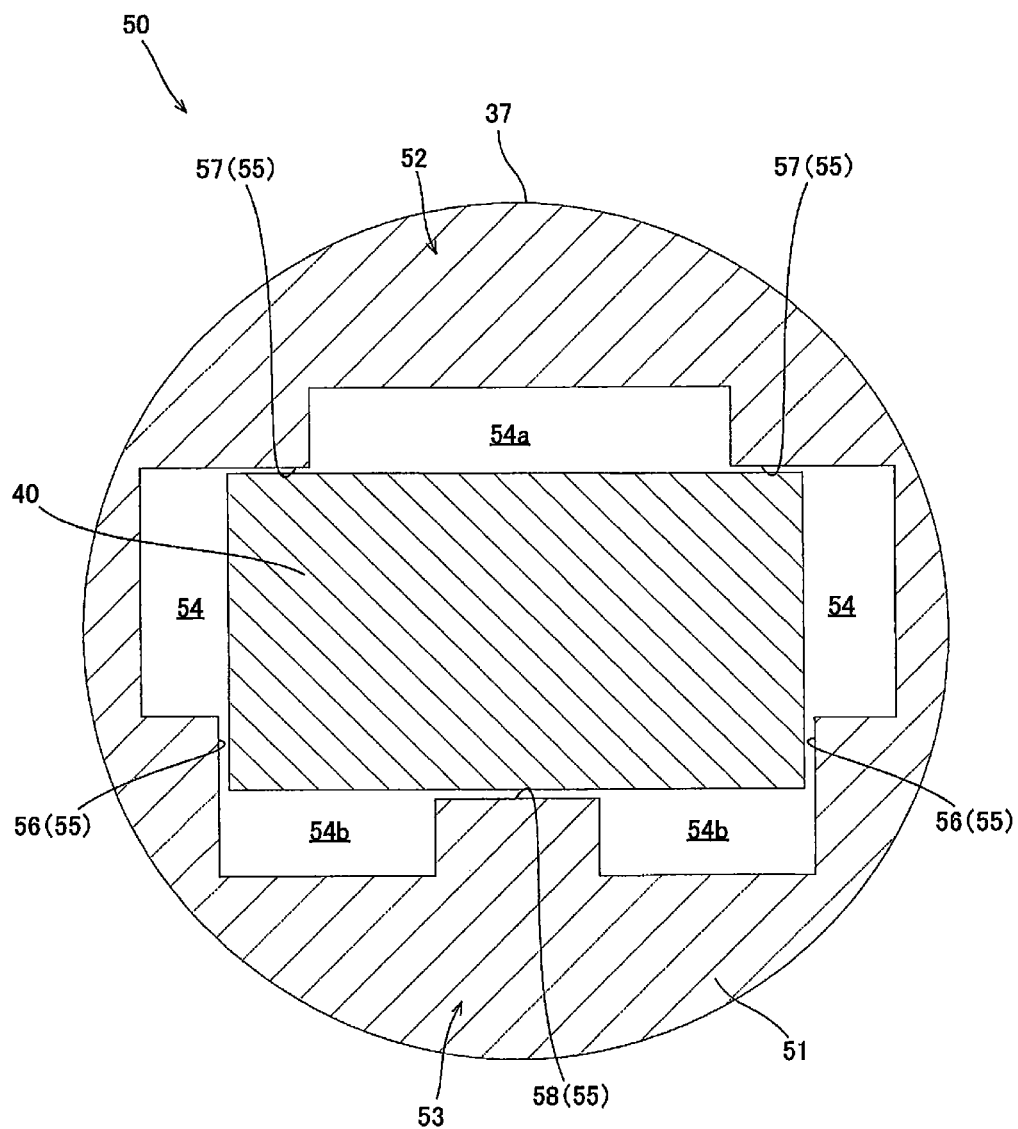
FIG. 8 is a view exemplifying a case where the present invention is applied to a linear guide of an all roller type.

In the above-described embodiment, the linear guide 10 in a case where a retainer is used has been exemplified; however, as illustrated in FIG. 8, the present invention can also be applied in the same way to a liner guide of an all roller type having no retainer. That is to say, even in the liner guide of the all roller type having the unloaded roller rolling path or the direction change path with no roller retainer belt guide groove in the side space portion 54, it is possible to obtain a linear guide capable of achieving the smooth guide motion without receiving an influence of the sliding resistance caused by the lubricant.

It is also possible, for example, to change a sectional shape of the track rail 20 and the movable block 30 as appropriate. Furthermore, the number of the endless circulating paths of the roller 40 can be changed as appropriate.

In addition, in the above-described embodiment, with regard to the roller 40, which is the rolling element, a case has been exemplified in which a length L of a roller width relative to a length D of a roller diameter is in a relationship of L/D>1. However, a scope to which the present invention is applied is not limited to this, and a roller having a relationship of L/D=1 (e.g., a square roller) and a roller having a relationship of L/D<1 may also be used. Furthermore, as for an arrangement relationship of the side space portion 54, the outer periphery side space portion 54a, and the inner periphery side space portion 54b relative to the roller as well as an arrangement relationship of the attitude support portions 55, every possible pattern can be used under a condition that satisfies support of the roller with five points.

Furthermore, the embodiment described by using FIGS. 1 to 8 relates to the motion guide device in which the attitude support portion that supports the attitude of the rolling element, which rolls on the unloaded rolling element rolling path or the direction change path, is formed asymmetrically interposing the rolling element. According to such configuration, the motion guide device according to the above-described embodiment achieves the smooth guide motion in which the plurality of rolling elements rolling on the unloaded circulation path does not receive an influence of the lubricant. However, in the motion guide device according to the present invention, it is possible to use a configuration in which a smoother guide motion can be realized by further stabilizing the rolling movement of the plurality of rolling elements. Thus, a configuration capable of further stabilizing the rolling movement of the plurality of rolling elements is described below by using FIGS. 9 to 11.

Figure 9:
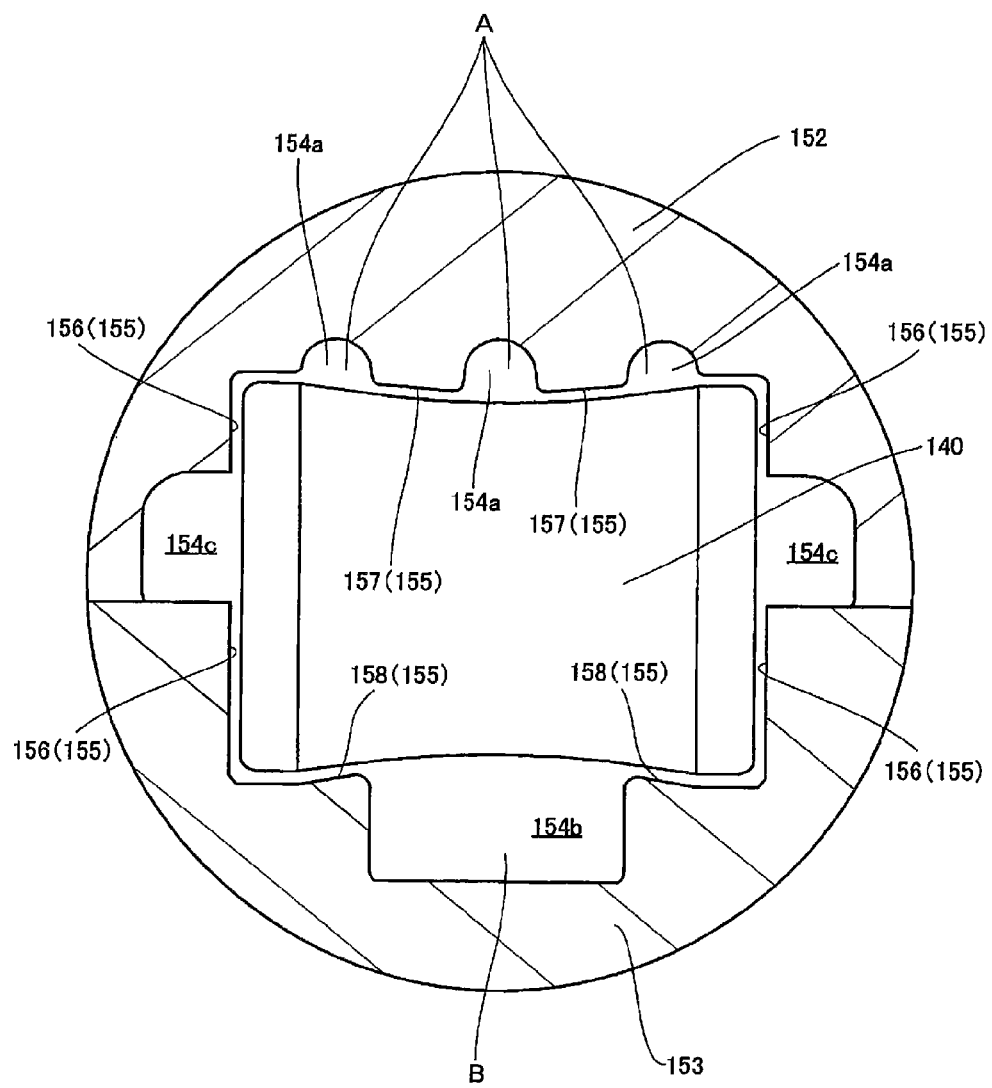
FIG. 9 is a view illustrating an internal shape of an unloaded roller rolling path and a direction change path applicable to a motion guide device according to a first modification.

First, FIG. 9 is a view illustrating an internal shape of the unloaded roller rolling path 50 and the direction change path 60 applicable to the motion guide device according to a first modification. Note that it is assumed that a drum-shaped roller 140 is used as a rolling element, which is used in the motion guide device illustrated in FIG. 9. In FIG. 9, an upper side of the drawing represents the outer periphery side of the unloaded roller rolling path 50 and the direction change path 60, and a lower side of the drawing represents the inner periphery side of the unloaded roller rolling path 50 and the direction change path 60.

As illustrated in FIG. 9, in the first modification, attitude support portions 155 that support the drum-shaped roller 140 are formed in a shape along an external shape of the drum-shaped roller 140. In particular, compared to the above-described embodiment, among the attitude support portions 155, a side surface side support portion 156 that supports a side surface side of the drum-shaped roller 140 is formed so as to cover a large area of the side surface of the roller, whereby it is configured such that support of the side surface of the drum-shaped roller 140 can be performed in a more stable state. Note that in a research by the present inventors, it has been verified that it is preferred that a pair of side surface side support portions 156 and 156, which is formed toward the sides, and a pair of side space portions 154c and 154c be formed to sides facing each other in an axis line direction of the drum-shaped roller 140 (that is, the side surface of the roller). Furthermore, it is preferred that a pair of side surface side support portions 156 and 156 be formed so as to face a range of substantially ¼ or larger of the side surface of the drum-shaped roller 140. By satisfying such configuration condition, the motion guide device according to the first modification is capable of achieving a stable guide motion.

With regard to the outer periphery side and the inner periphery side of the drum-shaped roller 140, it is preferred that the attitude support portions 155 (a first peripheral surface side support portion 157 on the outer periphery side and a second peripheral surface side support portion 158 on the inner periphery side) be provided on each of the sides along the external shape of the drum-shaped roller 140. It is more preferred that to the first peripheral surface side support portion 157 on the outer periphery side and to the second peripheral surface side support portion 158 on the inner periphery side, a plurality of the attitude support portions 155 be provided on each of the sides and that a space portion be provided between the plurality of support portions (an outer periphery side space portion 154a on the outer periphery side and an inner periphery side space portion 154b on the inner periphery side). By the first peripheral surface side support portion 157 and the second peripheral surface side support portion 158 being formed along the external shape of the drum-shaped roller 140, stable support of the drum-shaped roller 140 becomes possible. In addition, by providing the outer periphery side space portion 154a and the inner periphery side space portion 154b, each having a sufficiently large sectional area, the lubricant such as the grease is suitably held, whereby the rolling movement of the drum-shaped roller 140 is not hindered.

Note that a forming condition of the outer periphery side space portion 154a and the inner periphery side space portion 154b has been discovered through a research effort of the present inventors. In particular, in a section including an axis line of the drum-shaped roller 140 and taken vertically across the unloaded roller rolling path 50 or the direction change path 60, when A denotes a space area of the outer periphery side space portion 154a formed on the outer periphery side and B denotes a space area of the inner periphery side space portion 154b formed on the inner periphery side, clearly it is preferred that an inequality $A \leq B$ be satisfied. That is, it is preferred that the space portion on the inner periphery side be configured to have a large sectional area. This is because in greasing of the lubricant in a general motion guide device, an application opening is provided on the inner periphery side. Accordingly, in a case where the space portion on the inner periphery side is smaller than the space portion on the outer periphery side, it has been verified by the present inventors that a phenomenon occurs in which viscous resistance is increased during the greasing of the lubricant. Thus, by configuring such that the space portion on the inner periphery side has a large sectional area, there has been obtained an effect of preventing an increase of the viscous resistance of the lubricant, which has entered the space portion. By satisfying such configuration condition, the motion guide device according to the first modification is capable of achieving the stable guide motion.

As above, by using FIG. 9, the exemplary configuration condition of the new motion guide device capable of achieving the smooth guide motion by further stabilizing the rolling movement of the plurality of rolling elements has been described. Note, however, that a scope of the present invention is not limited to the one exemplified in FIG. 9. In the motion guide device according to the above-described first modification, in a section including an axis line of the rolling element and taken vertically across the unloaded rolling element rolling path or the direction change path, the attitude support portions is formed in plurality on each of the outer periphery side and the inner periphery side of the rolling element, and various modifications may be possible within a scope satisfying such configuration condition.

Figure 10:
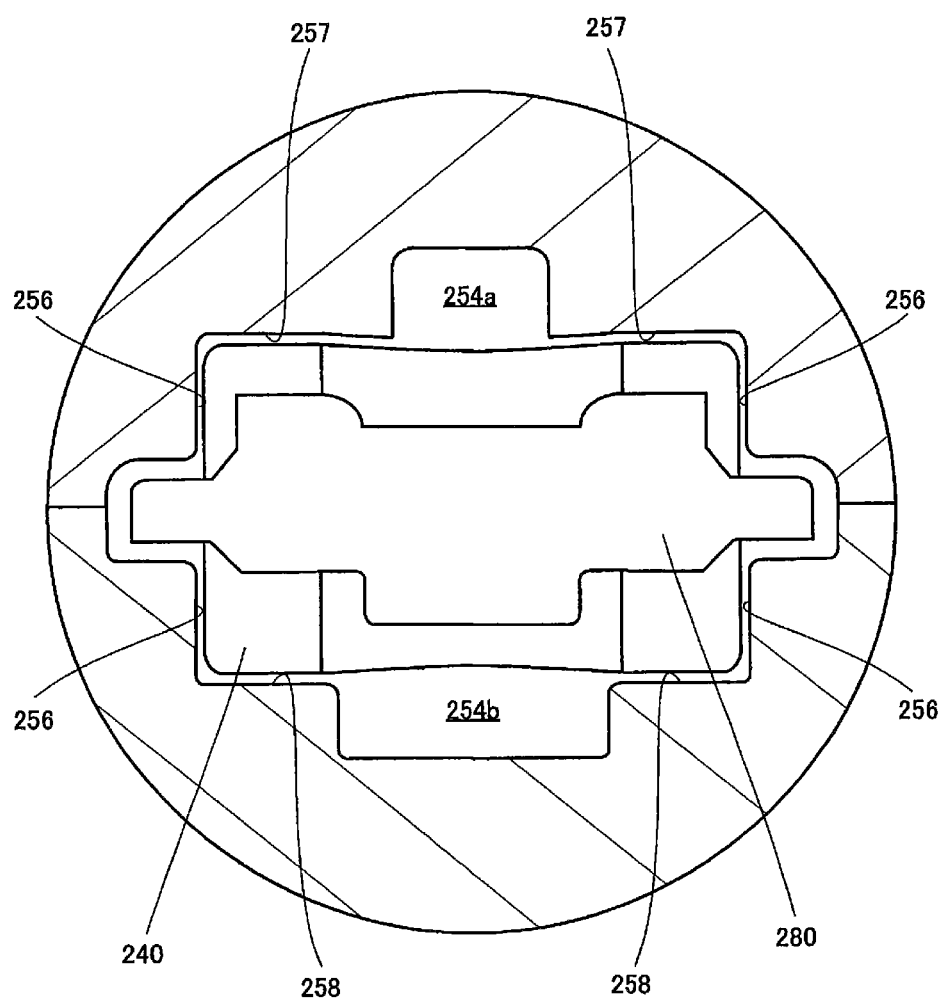
FIG. 10 is a view illustrating an internal shape of an unloaded roller rolling path and a direction change path applicable to a motion guide device according to a second modification.

Specifically, as illustrated in FIG. 10, the present invention is also applicable to a motion guide device configured to include a drum-shaped roller 240 having a drum-shaped rolling element, and the plurality of drum-shaped rollers 240 is in an aligned state by a roller retainer 280. Here, FIG. 10 is a view illustrating an internal shape of an unloaded roller rolling path 50 and a direction change path 60 that are applicable to the motion guide device according to a second modification. For the motion guide device according to the second modification illustrated in FIG. 10, in the same way as the above-described first modification, a side surface side support portion 256 that supports a side surface side of the drum-shaped roller 240 is formed so as to cover a large area of the roller side surface, whereby it is configured such that support of the side surface of the drum-shaped roller 240 can be performed in a more stable state. In addition, by a first peripheral surface side support portion 257 on the outer periphery side and a second peripheral surface side support portion 258 on the inner periphery side being formed along an external shape of the drum-shaped roller 240, it becomes possible to stably support the drum-shaped roller 240. Also, by providing an outer periphery side space portion 254a and an inner periphery side space portion 254b each having a sufficiently large sectional area, the lubricant such as the grease is suitably held, whereby a smooth rolling movement of the drum-shaped roller 240 is achieved. Furthermore, in the second modification, in the same way as the above-described first modification, it is configured such that the sectional area of the inner periphery side space portion 254b is larger than that of the outer periphery side space portion 254a. Due to such features, the motion guide device according to the second modification is capable of achieving the stable guide motion. Note that content of the present invention according to the second modification is not limited to the drum-shaped roller; for example, the same effect can be obtained by using a cylindrically-shaped roller.

Note that the motion guide device according to the second modification is provided with the roller retainer 280. In particular, inside of the direction change path 60, when a line of a plurality of drum-shaped rollers 240 makes a turning movement, the roller retainer 280 makes a deforming movement toward the inner periphery side so as to prevent the drum-shaped roller 240 from being pushed toward the outer periphery side. That is, inside of the direction change path 60, the roller retainer 280 moves toward the inner periphery side and deforms the inner periphery side space portion 254b; however, since a size of the inner periphery side space portion 254b is designed taking into account decrement of the space due to deformation of the roller retainer 280, the viscous resistance of the lubricant is maintained to be in a suitable state all the time.

As above, the preferred modifications of the present invention have been described by using FIGS. 9 and 10; however, the technical scope of the present invention is not to be limited to the scope described in the above-described modifications. It is possible to add various modifications or improvements to the above-described modifications furthermore.

Figure 11:
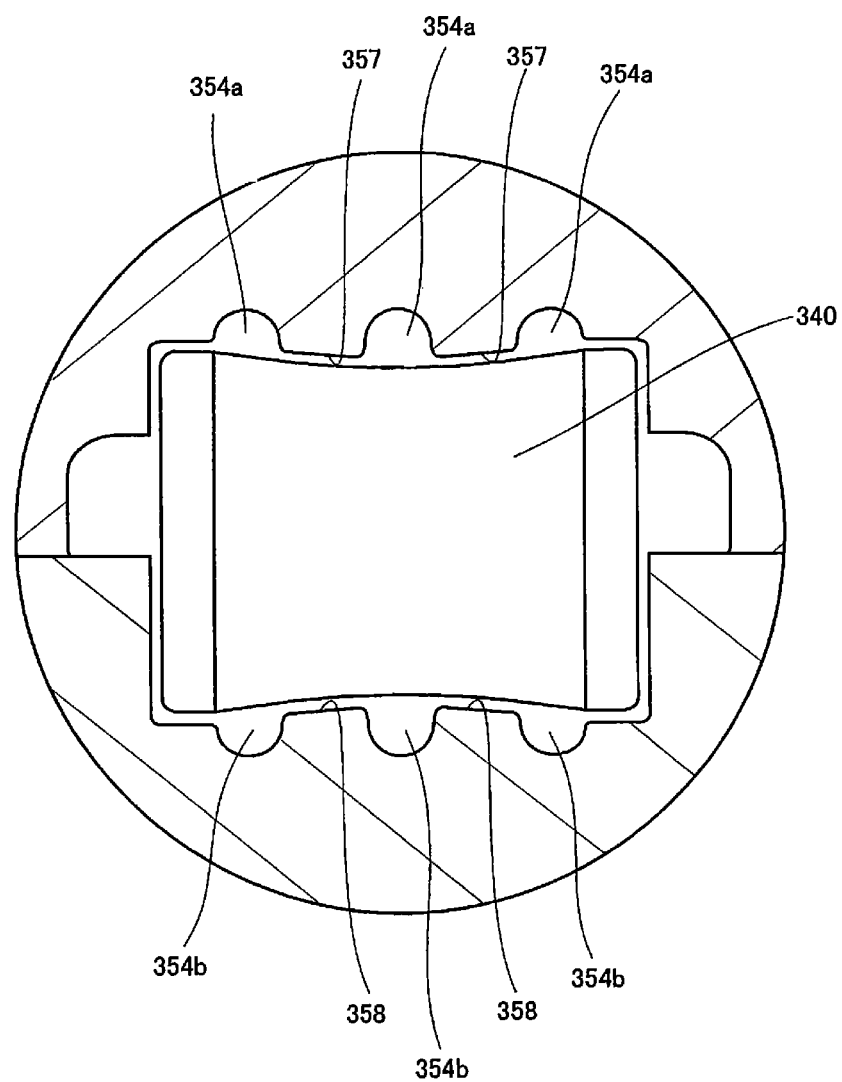
FIG. 11 is a view illustrating various possible modifications of the present invention.

For example, as illustrated in FIG. 11, according to a use condition of the motion guide device, a first peripheral surface side support portion 357 on the outer periphery side and a second peripheral surface side support portion 358 on the inner periphery side may be configured to be axially symmetric interposing a roller 340, or the size of an outer periphery side space portion 354a and an inner periphery side space portion 354b may be configured to be the same. It is clear from descriptions in claims that an embodiment added with such modification or improvement may also be within the technical scope of the present invention.

Note that the motion guide device according to this embodiment and these modifications can be assembled, as an element component, into a wide range of sectors ranging from an industrial machinery sector such as a machine tool, a semiconductor/liquid crystal manufacturing device (for example, mounter), and a robot to a household sector such as a seismic isolator, a built-in kitchen, various game consoles, medical machinery, food machinery, and a conveying device.

REFERENCE NUMERALS 10 linear guide, 20 track rail, 21 projection, 22 roller rolling surface, 30 movable block, 31 movable block main body, 32 end plate, 33 loaded roller rolling surface, 35 central portion, 36 side wall unit, 37 through hole, 40, 340 roller, 140, 240 drum-shaped roller, 50 unloaded roller rolling path, 51 pipe member, 52, 152 outer periphery side guide portion 53, 153 inner periphery side guide portion 54, 154c side space portion, 54a, 154a, 254a, 354a outer periphery side space portion, 54b, 154b, 254b, 354b inner periphery side space portion, 55, 155 attitude support portion, 56, 156, 256 side surface side support portion, 56' portion equivalent to the side surface side support portion, 57, 157, 257, 357 first peripheral surface side support portion, 57' portion equivalent to the first peripheral surface side support portion, 58, 158, 258, 358 second peripheral surface side support portion, 58' portion equivalent to the second peripheral surface side support portion, 60 direction change path, 61 R piece, 70 load transfer roller rolling path, 80, 280 roller retainer, 81 spacer, 82 belt portion, A space area of the outer periphery side space portion, B space area of the inner periphery side space portion, X virtual curve drawn by a locus of a rotation axis of the roller.

The invention claimed is:

1. A motion guide device comprising:
   a track member having a rolling element rolling surface extending in a longitudinal direction;
   a moving member having a loaded rolling element rolling surface facing the rolling element rolling surface, an unloaded rolling element rolling path extending in parallel with the loaded rolling element rolling surface, and a pair of direction change paths configured to connect the loaded rolling element rolling surface with the unloaded rolling element rolling path; and
   a plurality of rolling elements arranged in an endless circulating path including a loaded rolling element rolling path between the rolling element rolling surface of the track member and the loaded rolling element rolling surface of the moving member, the unloaded rolling element rolling path, and the direction change path; wherein
   in a section including an axis line of the rolling element and taken vertically across the unloaded rolling element rolling path or the direction change path, the unloaded rolling element rolling path or the direction change path includes:
   an attitude support portion configured to support an attitude of the rolling element rolling on the unloaded rolling element rolling path or the direction change path; and
   a space portion to which a lubricant present inside of the unloaded rolling element rolling path or the direction change path is released;
   the attitude support portions include five attitude support portions:
   in the section including the axis line of the rolling element and taken vertically across the unloaded rolling element rolling path or the direction change path, a pair of side surface side support portions formed toward sides facing each other in the axis line of the rolling element;
   a pair of first peripheral surface side support portions formed along a rolling direction of the rolling elements on either one of an outer periphery side or an inner periphery side of the unloaded rolling element rolling path or the direction change path; and
   one second peripheral surface side support portion formed along the rolling direction of the rolling elements on the other one of an outer periphery side or an inner periphery side of the unloaded rolling element rolling path or the direction change path;
   The space portions arranged between respective five attitude support portions include the pair of side surface side support portions, the pair of first peripheral surface side support portions and one second peripheral surface side support portion, and The rolling element rolling the unloaded rolling element rolling path or the direction change path is supported the attitude by five attitude support portions and is surrounded by five space portions.

2. The motion guide device according to claim 1, wherein the attitude support portion is formed into a shape along an external shape of the rolling element.

3. The motion guide device according to claim 1, wherein in the section including the axis line of the rolling element and taken vertically across the unloaded rolling element rolling path or the direction change path, The space portion is formed when A denotes a space area of the space portion formed on the outer periphery side and B denotes a space area of the space portion formed on the inner periphery side, an inequality A≤B is satisfied.

4. The motion guide device according to claim 1, wherein the rolling element has a drum shape.

* * * * *